United States Patent [19]

Hiramatsu et al.

[11] Patent Number: 4,850,186
[45] Date of Patent: Jul. 25, 1989

[54] THREAD OF CARBON FIBER

[75] Inventors: Tohru Hiramatsu, Matsuyama; Tomitake Higuchi, Ehime; Akira Nishimura, Otsu, all of Japan

[73] Assignee: Toray Industries, Inc., Tokyo, Japan

[21] Appl. No.: 228,089

[22] Filed: Aug. 4, 1988

[30] Foreign Application Priority Data

Aug. 13, 1987 [JP] Japan ............................ 62-202129

[51] Int. Cl.⁴ .................... D02G 3/02; D02G 3/28; D02G 3/46; D01F 9/12
[52] U.S. Cl. .............................. 57/236; 57/243; 57/903; 423/447.2
[58] Field of Search .................. 57/236–239, 57/243–245, 902, 903; 423/447.1, 447.2

[56] References Cited

U.S. PATENT DOCUMENTS

| | | | |
|---|---|---|---|
| 3,838,562 | 10/1974 | Park | 57/243 |
| 3,841,079 | 10/1974 | Ram et al. | 423/447.2 X |
| 4,051,659 | 10/1977 | Blakelock | 57/243 |
| 4,430,851 | 2/1984 | Sundet | 57/236 X |
| 4,513,565 | 4/1985 | Negishi et al. | 57/236 |
| 4,520,623 | 6/1985 | Ogawa et al. | 423/447.2 X |
| 4,714,642 | 12/1987 | McAliley et al. | 423/447.2 X |

Primary Examiner—John Petrakes
Attorney, Agent, or Firm—Armstrong, Nikaido, Marmelstein, Kubovcik & Murray

[57] ABSTRACT

A thread comprising plural carbon fiber strands having a first twist of 80 turns/m or more and plied and twisted to give a final twist of 50 turns/m or more in the direction reverse to the first twist. The thread has a fineness of 3000 denier or less and a knot strength of 1.0 g/denier or more, and the single fibers of the carbon fiber strands constituting the thread each have a fineness of 0.7 denier or less and a loop breaking strain of 2.5% or more.

6 Claims, 2 Drawing Sheets

THREAD OF CARBON FIBER

BACKGROUND OF THE INVENTION

The present invention relates to a carbon fiber thread having high performance and particularly to a carbon fiber thread which exhibits excellent processability, shape retention, and reinforcing effect, for example, when used for stitching of a reinforcing fabric for a composite material.

A woven fabric, such as a carbon fiber woven fabric or a hybrid woven fabric comprising a carbon fiber and other fiber having high strength and high modulus, is utilized as a reinforcing material for a composite material. When such a fabric is used as a reinforcing material, it is formed after, for example, it is either impregnated with a matrix resin and plural impregnated fabrics are laminated or preformed into a desired shape and impregnated with a matrix resin. When either a plurality of fabrics are laminated, or a fabric preformed into a desired shape is impregnated with a matrix resin, or hot forming is conducted, the above-described laminated fabrics are generally stitched with a stitching thread in order to improve the shape retention or the peel strength between the laminated fabrics.

Examples of the stitching thread include a glass fiber, a polyester fiber, an aramid fiber, and a blended yarn of carbon fiber and organic fiber. However, these stitching threads have drawbacks, such as high water absorption, poor heat resistance, poor adhesion to a matrix material such as resin or poor strength and modulus, which make it impossible to sufficiently reflect the characteristics of the reinforcing fabric in the composite material.

On the other hand, the above-described problems may be solved by preparing the stitching thread of a carbon fiber only. However, the carbon fiber has characteristics such that it is strong against tension but fragile against bending. This raised problems such as occurrence of breakage and fuzzing of the thread caused by thrust with a needle and friction with the fabric in the process of stitching. Therefore, it is the state of the art that no satisfactory stitching thread for reinforcing fabric has been prepared.

SUMMARY OF THE INVENTION

An object of the present invention is to provide a carbon fiber thread which hardly causes breakage and fuzzing of a thread in the process of stitching.

Another object of the present invention is to provide a carbon fiber stitching thread capable of improving the peel strength between reinforcing fabrics when the laminated reinforcing fabrics are stitched.

In order to attain the above-described objects, the thread of the present invention has a basic thread structure prepared by doubling or plying and twisting plural carbon fiber strands having first twists in the direction reverse to the first twists to give final twists, wherein the number of first twists and the number of final twists are 80 turns/m or more and 50 turns/m or more, respectively. Further, the thread of the present invention has features that the fineness and knot strength of the thread are 3000 denier or less and 1.0 g/denier or more, respectively, and the fineness of the single fibers of the above-described carbon fiber strand constituting the thread and the loop breaking strain of the single fiber as determined according to the single fiber loop test are 0.7 denier or less and 2.5% or more, respectively.

DESCRIPTION OF THE PREFERRED EMBODIMENTS

Figure 1:
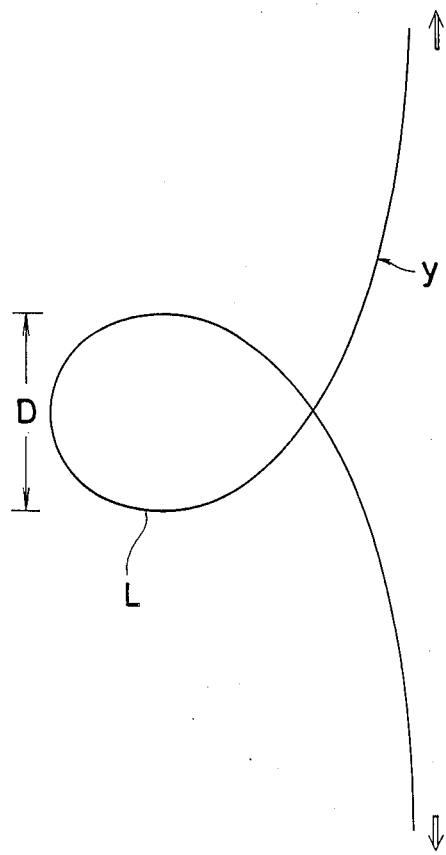
FIG. 1 is a representative view of a single fiber loop in the single fiber loop test.

The thread of the present invention comprises a plurality of interlaced carbon fiber strands. The interlacing structure should be one formed by plying and twisting the above-described plural carbon fiber strands having first twists to give final twists, thereby preparing a thread.

The interlacing structure may be not the above-described multi-ply twist structure but a braid structure. However, a braid comprising plural carbon fiber strands has a drawback, such as poor shape retention, because the braid causes the thread to be twisted due to the residual torque which the carbon fiber strands have. Further, since the cross section of the braid comprising carbon fiber strands is not uniform in the longitudinal direction thereof, the frictional force between the thread and the fabric is increased during stitching, which unfavorably damages the fabric.

On the other hand, as opposed to such a braid, the thread of the present invention comprises a multi-ply twist structure prepared by plying and twisting carbon fiber strands having first twists in the direction reverse to the first twists to give final twists. Therefore, a thread free from twisting and having excellent shape stability can be formed by balancing the first twists against the final twists. Further, the cross section of the thread is uniform in the longitudinal direction thereof, which makes it possible to substantially prevent the occurrence of the damage to the fabric during stitching.

With respect to the thread of the present invention, it is necessary that in the above-described multi-ply twist structure, the number of first twists be 80 turns/m or more, particularly 80 to 400 turns/m and the number of final twists be 50 turns/m or more, particularly 50 to 300 turns/m. When the number of twists is smaller than the above-described value, the uniformity of the cross section in the longitudinal direction of the thread and the bundling property are lowered, which brings about the occurrence of fuzzing of the thread and damage to the fabric in the process of stitching. On the other hand, when the number of twists is too large, the translation of strength of the stitching thread is lowered because it is difficult to impregnate the thread with a matrix material, such as a resin, during forming of the composite material.

In the present invention, the term "number of first twists of the carbon fiber strands" is intended to mean the number of twists given to each carbon fiber strand before plying and twisting. Therefore, when the final twists are given in the reverse direction of the first twists during doubling, the number of twists remaining in the constituent carbon fiber strands which have been plied and twisted into a thread is equal to the number of first twists minus the number of final twists. That is, the expression "a first twist of 80 turns/m or more which the carbon fiber strands specified in the present invention have" is intended to mean that the number of twists obtained by adding the number of final twists to the number of twists of the constituent carbon fiber strand in the form of a commercial product is 80 turns/m or more.

The number of carbon fiber strands constituting the thread is preferably 2 to 6, more preferably 2 to 3. The selection of the above-described number of carbon fiber strands makes it easy to prepare a stitching thread and improve the cross section of the stitching thread.

In the thread of the present invention, it is preferred that the lengths of the carbon fiber strands constituting the thread be substantially the same with each other. The expression "the lengths of the carbon fiber strands are substantially the same with each other" used herein is intended to include not only the case where the lengths of the carbon fiber strands are literally identical to each other but also the case where the variation in the length is as small as 0.5% or less.

When the lengths of plural carbon fiber strands are different from each other, the stretching of the thread brings about a condition where a load is first applied on the shortest carbon fiber strand and then on the next shortest carbon fiber strand, which unfavorably lowers the tenacity of the thread to a great extent. In this case, it is a matter of course that the knot tenacity of the thread is also lowered.

In the thread of the present invention, it is necessary that not only the thread have the above-described interlacing structure but also the fineness be 3000 denier or less. The fineness is preferably 1500 denier or less, still preferably 1000 denier or less. When the fineness of the thread exceeds 3000 denier, the friction between the thread and the fabric is increased in the stitching process, which not only renders both the thread and the fabric susceptible to damage but also brings about an increase in the yarn slippage of the fibers constituting the fabric. The damage and yarn slippage both cause a lowering in the physical properties of the composite material.

The fineness of carbon fiber strands constituting the above-described thread is preferably 1000 denier or less, more preferably 500 denier or less. When the fineness of carbon fiber strand exceeds 1000 denier, the twisting of the carbon fiber strands yields a thread having a nonuniform cross section. As in the above-described case, this brings about an increase in the friction between the thread and the fabric in the step of stitching, which renders both the stitching thread and the fabric susceptible to damage.

In the thread of the present invention, it is necessary that the thread have not only a fineness of 3000 denier or less as described above but also a knot strength of 1.0 g/denier or more. The knot strength is preferably 1.5 g/denier or more, still preferably 2.5 g/denier or more. The processability in the process of stitching can be improved only when the thread has a fineness of 3000 denier or less and a knot strength of 1.0 g/denier or more. That is, under these conditions, the breakage and fuzzing of the thread during stitching could remarkably be lowered.

In order for the thread of the present invention to satisfy the above-described requirement for the knot strength, it is necessary that the single fibers of the carbon fiber strands constituting the thread each have a fineness of 0.7 denier or less, preferably 0.5 denier or less and a loop breaking strain of 2.5% or more, preferably 3.5% or more as determined according to the single fiber loop test. When the single fiber has a fineness of more than 0.7 denier or a loop breaking strain of less than 2.5% as determined according to the single fiber loop test, it is impossible to prepare a thread having a knot strength of 1.0 g/denier or more. In order to prepare a thread having the above-described knot strength, the strength of the carbon fiber strand is preferably 300 kg/mm$^2$ or more, particularly preferably 500 kg/mm$^2$ or more.

In the present invention, the fiber characteristics were determined by the following methods.

(A) Fineness (thread, fiber strand, and single fiber):

The fineness is determined according to the method prescribed in ASTM D578-61.

(B) Knot strength:

The knot strength is determined according to the method prescribed in ASTM D2256-75.

(C) Strand strength:

The strand strength is determined according to the resin-impregnated strand test prescribed in JIS R7601.

(D) Loop breaking strain according to the single fiber loop test:

The single fiber loop test is conducted with a zoom-lens optical microscope because the loop of the single fiber to be measured is small. The image observed under the optical microscope is recorded with a TV camera which hardly causes a residual image to read the diameter D of a loop L of a single fiber y immediately before breaking as shown in FIG. 1 on a cathode ray tube (CRT). The magnification of observation and the distortion of the image plane are checked with a microscale to adjust the final magnification of observation to 20 to 250.

The following apparatuses were used in the above-described measurements:

Model SMZ-1 stereomicroscope; a product of Nippon Kogaku K.K.

Model VC 820L subminiature photographing apparatus; a product of Tokyo Denshi Kogaku K.K.

Model 12M30A 12" video monitor; a product of Tokyo Electronic Industry Co., Ltd.

Model NV-180 video MACLORD; a product of Matsushita Electric Industrial Co., Ltd.

The single fiber loop is prepared by placing a single fiber on a slide glass, dropping one or two drops of glycerin on the central portion of the single fiber, twisting the single fiber to form a loop, and placing a cover glass on the loop. This is placed under the above-described optical microscope and both ends of the single fiber y are pulled in the direction of arrows shown in FIG. 1 with both ends of the single fiber on the slide glass with fingers while maintaining the loop within a field of view through observation on a CRT to apply a distortion until the loop L is broken.

In the above-described step, the cover glass is placed on the loop in order to prevent the loop from loosening because the loop has no knot, while glycerin is used for the purpose of decreasing the restriction against the fiber by the cover glass and the slide glass. The loop is pulled with fingers. Since the shape and the dimension of the loop portion are important in this measurement, the primitive way of pulling loop with fingers raises no problem. Rather this means makes it easy to always maintain the loop within a field of view and is therefore efficient from the viewpoint of handling.

The loop breaking strain ($\epsilon$) according to the above-described loop test is calculated by the following equation:

$$\epsilon = 1.066 \frac{d}{D} \times 100$$

wherein d is the diameter of the single fiber (μm); and D is the diameter of the loop just before breaking (μm).

(E) Number of final twists:

A thread is set on a twist counter, and the final twists are completely loosened under conditions of a test length of 500 mm and an initial load of 0.03 g/denier to determine the number of the final twists.

The above-described procedures are repeated 5 times, and the average value thereof (n=5) is regarded as the number of the final twists.

(F) Number of first twists:

A thread is set on a twist counter, and the final twists are completely loosened under the above-described conditions. Only one carbon fiber strand is left as it is and the other carbon fiber strands are cut and removed. The twists of the remaining carbon fiber strand are completely loosened to determine the number of the first twists.

The above-described procedures are repeated 5 times, and the average value thereof (n=5) is regarded as the number of the first twists.

(G) Difference in yarn length of carbon fiber strand:

A thread is exactly cut to have a test length of 300 mm, and the final twists and first twists are completely loosened to measure the yarn length of each carbon fiber strand. The difference in the yarn length between the carbon fiber strand having the largest yarn length and the carbon fiber strand having the smallest yarn length is calculated to determine the percentage of the difference with respect to a test length of 300 mm.

The above-described procedures are repeated 5 times, and the average value thereof (n=5) is regarded as the difference in the yarn length of constituent carbon fiber strands.

The process for preparing the thread of the present invention will now be described.

The thread of the instant invention can be prepared by previously twisting a carbon fiber strand comprising single fibers each having a fineness of 0.7 denier or less and a loop breaking strain of 2.5% or more as determined according to the single fiber loop test, preferably a carbon fiber strand having a fineness of 1000 denier or less and a strand strength of 300 kg/mm² or more according to known twisting means, thereby giving first twists, and then twisting the twisted yarns in the direction reverse to the first twists to give final twists while, for example, doubling 2 to 6 twisted yarns.

Figure 2:
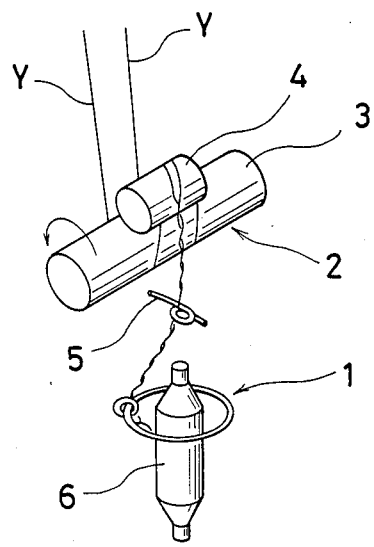
FIG. 2 is a schematic perspective view of a ring twisting machine for use in the preparation of the carbon fiber thread of the present invention.

The above-described plural carbon fiber strands can be plied and twisted by using a ring twister as shown in FIG. 2.

In the drawing, numeral 1 designates a ring twisting section. The nip roller 2 comprises a pair of driving roller 3 and a driven roller 4. For example, two carbon fiber strands Y, Y which each have previously been twisted to give a first twist of 80 turns/m or more are fed to the ring twister so that the carbon fiber strands Y, Y are brought into contact with the surface of the driving roller 3 and that of the driven roller 4 of the nip roller 2 over at least one-third of a circuit thereof while maintaining the spacing between the two carbon fiber strands Y, Y. Then, when the carbon fiber strands are fed from the nip roller 2 through the guide 5 into the ring twisting section 1, they are doubled and twisted with a final twist of 50 turns/m or more and wound up in the form of the thread of the present invention on a package 6.

At this time, the first twists given to the carbon fiber strands are partly loosened during doubling and twisting for giving the final twists, which brings about a decrease in the number of first twists.

In the above-described method, the spacing between a plurality of carbon fiber strands to be fed into the nip roller is maintained constant in order to prevent the carbon fiber strands from intertwisting each other and, at the same time, to enable the tension to effectively be conducted. This expedient is not conducted in the doubling of threads for general clothing. Further, the carbon fiber strands are fed to the nip roller so as to be brought into contact with each roller constituting the nip roller over at least one-third of a circuit of each roller for the purpose of preventing the occurrence of the so-called difference in the yarn length between the carbon fiber strands constituting the thread through the prevention of slipping of the carbon fiber strands on the nip roller. The nip roller for use in the preparation of a thread for clothing serves to merely nip the thread of fiber fed. Therefore, the above-described conventional process is fully different from the process for preparing the thread of carbon fiber of the present invention in this aspect as well.

There is no particular limitation with respect to the kind of the carbon fiber strand used in the thread of the present invention, and both acrylonitrile carbon fiber and pitch carbon fiber may be used.

For example, the acrylonitrile carbon fiber may be one prepared by a conventional technique, i.e., by oxidizing and carbonizing an acrylonitrile fiber. The acrylonitrile fiber used as the starting material is preferably a fiber prepared by a combination of spinning according to the dry-jet-wet spinning process with the use of a silicone lubricant as a process lubricant. The conditions for oxidation of the acrylonitrile fiber are preferably adjusted so that the degree of oxidation in the oxidation system is 3.7 to 7.0% in terms of moisture regain, while the conditions for the carbonization are preferably adjusted so that the temperature rising rate is 100° to 1000° C./min in a zone of a temperature ranging from 300° to 700° C. and a zone of a temperature ranging from 1000° to 1200° C. The carbon fiber strand used in the present invention may be subjected to a known surface treatment for the purpose of enhancing the affinity for the matrix resin. Further, it is desired to use a sizing agent for the purpose of improving the processability during the formation of a thread and improving the processability during stitching. The kind of the sizing agent and the amount of sizing thereof may be selected based on known conditions depending upon intended applications.

The present invention will now be described in more detail with reference to the following Examples.

EXAMPLE 1

An ammonia gas is blown into a solution of an acrylonitrile (hereinafter referred to as "AN") copolymer having an intrinsic viscosity [η] of 1.80 and comprising 99.5% by mole of AN and 0.5% by mole of itaconic acid in dimethyl sulfoxide (hereinafter referred to as "DMSO") to substitute an ammonium group for hydrogen of the carboxyl terminal of the copolymer, thereby modifying the polymer. A DMSO solution containing 20% by weight of the modified polymer is filtered by making use of a sintered metallic filter having a maximum mesh size of 3 μm as a filter medium to prepare a spinning solution. The spinning solution thus prepared was once extruded through a spinneret having 500 holes each having a diameter of 0.1 mm into the air, travelled in the air by about 3 mm, and introduced into an aqueous 30% DMSO solution of about 30° C., thereby preparing a coagulated fiber yarn through dry-jet-wet spinning.

The coagulated fiber yarn was washed with water, drawn at a draw ratio of about four in hot water, and immersed in a mixed lubricant comprising an aqueous 0.8% solution of a polyethylene glycol (hereinafter referred to as "PEG") modified polydimethylsiloxane (degree of PEG modification: 50% by weight) and an aqueous 0.8% dispersion composed of 85 parts of an amino modified polydimethylsiloxane (degree of amino modification: 1% by weight) and 15 parts of a nonionic surfactant and then dried and densified on a heating roll having a surface temperature of 130° C. The dried and densified fiber yarn was drawn by a factor of about 3 in heated steam to prepare an acrylic fiber yarn having a single fiber fineness of 0.8 denier and a total fineness of 400 denier.

The acrylic fiber yarn was heated in the air of 240° to 260° C. under a draw ratio of 1.05 to prepare an oxidized fiber yarn having a moisture regain of 5.0%.

The moisture regain for determining the degree of oxidation is measured according to the following procedures. Namely, about 2 g of an oxidized yarn is taken out and placed in a weighing bottle. This weighing bottle with its stop being opened is then placed in a desiccator containing a solid phase-containing, aqueous ammonium sulfate solution in the bottom, at room temperature for about 16 hours to permit the yarn to absorb moisture.

After withdrawal from the desiccator, the yarn is precisely weighed quickly and the weight at this time is represented by $W_1$.

The above yarn is then placed in a weighing bottle, and this bottle with its stop being opened is placed in a dryer at 120° C. for 2 hours. After quick application of the stop to the weighing bottle, the bottle is quickly transferred to a desiccator containing phosphorous pentaoxide in the bottom, and allowed to cool for 5 minutes in the desiccator. After cooling, the dry yarn is precisely weighed quickly, and the weight at this time is represented by $W_0$. The moisture regain is calculated from the formula:

$$\frac{W_1 - W_0}{W_0} \times 100 \, (\%).$$

The level of an oil finish adhered to an acrylonitrile polymer fiber is measured according to the following procedures. Namely, about 3 g of the fiber is taken out and precisely weighed. This weight is represented by $W_1$.

Then, the oxidized fiber yarn was carbonized in a nitrogen atmosphere having a maximum temperature of 1400° C. at a temperature rising rate of about 600° C./min in each of a zone of a temperature ranging from 300° to 700° C. and a zone of a temperature ranging from 1000° to 1200° C., thereby preparing a carbon fiber yarn.

The carbon fiber yarn thus prepared is subjected to an electrolytic surface treatment in an aqueous electrolyte solution by making use of the carbon fiber yarn as an anode, washed with water, dried, and sized with about 1% of an epoxy sizing agent to prepare a carbon fiber filament strand.

The above-described carbon fiber filament strand had a fineness of about 200 denier and a strand strength of 560 kg/mm². The single fibers constituting the carbon fiber filament strand had a fineness of 0.4 denier and a loop breaking strain of 4.1% as determined according to the single fiber loop test.

The above-described carbon fiber filament strand was twisted to give an S-twist of 250 turns/m as first twists. Then, three S-twisted carbon fiber strands were fed at a rate of 24 m/min between nip rollers having the same peripheral speed while leaving a space of 5 mm among the carbon fiber strands so that each carbon fiber strand is brought into contact with the surface of each nip roller over one-half of the peripheral length thereof, and the three carbon fiber strands coming out of the nip rollers were plied and twisted with a ring twister to give a Z-twist of 160 turns/m as final twists, thereby preparing a thread.

The thread thus prepared had a fineness of about 600 denier and a knot strength of 3.1 g/denier. Further, the difference in the yarn length between the carbon fiber strands constituting the thread was as small as about 0.2%, so the yarn lengths of the carbon fiber strands were substantially identical with each other.

A laminate of carbon fiber woven fabrics was stitched with the above-described thread.

First of all, four plain weaves of a carbon fiber "Torayca" T400-3000-50A having a mass per unit area of 200 g/m² were laminated (lamination angle: 45°/0°/0°/45°) to prepare a base fabric having a width of 20 cm and a length of 150 cm. The base fabric was stitched with the above-described thread at a pitch of 7.5 mm and a stitch speed of 20 needles/min through a single chain stitch by a stitching machine provided with a needle device into which 25 beard needles have been embedded at intervals of 7.5 mm. No breakage of the thread occurred during stitching. Further, after stitching, no fuzzing was observed.

Thereafter, the above-described stitched base fabric was filled into the space of a cavity formed by a male die and a female die, and an epoxy resin (Epikote 827/NMA/EMI) containing a curing agent previously added thereto is penetrated into the space of the cavity, followed by curing of the resin, thereby preparing a cured laminate having a thickness of 0.91 mm, a width of 20 cm and a length of 150 cm. The stitched base fabric brought about no fiber slippage and could easily be filled within the cavity.

A specimen having a width of 25 mm and a length of 230 mm was cut from the cured laminate thus prepared and subjected to a repeated fatigue test under conditions of a maximum tensile load of 750 kg and a minimum tensile load of 100 kg. In the test, the cured laminate was damaged after repetition of about $2 \times 10^5$ times.

EXAMPLE 2

A carbon fiber strand having a fineness of about 400 denier was prepared in the same manner as that of Example 1, except that the spinneret was one having 1000 holes. The carbon fiber strand thus prepared had a strand strength of 530 kg/mm², a single fiber fineness of 0.4 denier, and a loop breaking strain of 4.0% as determined according to the single fiber loop test.

The above-described carbon fiber strand was twisted to give an S-twist of about 250 turns/m as first twists.

Then, three S-twisted carbon fiber strands were plied and, at the same time, twisted to give a Z-twist of about 160 turns/m as final twists, thereby preparing a thread.

The thread thus prepared had a fineness of about 1200 denier and a knot strength of 3.2 g/denier.

Stitching was conducted with the above-described thread in the same manner as that of Example 1. Slight yarn slippage was observed in the fibers constituting the base fabric. However, as with Example 1, the thread caused neither breakage nor fuzzing of the thread and exhibited excellent stitch processability.

EXAMPLE 3

A thread having a fineness of about 1600 denier and a knot strength of about 4.2 g/denier were prepared in the same manner as that of Example 2, except that the number of carbon fiber strands for plying was 4.

Stitching was conducted with the above-described thread in the same manner as that of Example 1. In the stitching, slight yarn slippage and fuzzing were observed in the fibers constituting the base fabric. However, the stitching could smoothly be conducted without causing any breakage of the thread.

EXAMPLE 4

A carbon fiber strand having a fineness of about 800 denier was prepared in the same manner as that of Example 1, except that the spinneret was one having 2000 holes. The carbon fiber strand thus prepared had a strand strength of 470 kg/mm$^2$, a single fiber fineness of 0.4 denier, and a loop breaking strain of 3.7% as determined according to the single fiber loop test.

The above-described carbon fiber strand was twisted to give an S-twist of about 200 turns/m as first twists. Then, three S-twisted carbon fiber strands were plied and, at the same time, twisted to give a Z-twist of about 140 turns/m as final twists, thereby preparing a thread.

The thread thus prepared had a fineness of about 2400 denier and a knot strength of 4.5 g/denier.

Stitching was conducted with the above-described thread in the same manner as that of Example 1. In the stitching, slight yarn slippage and fuzzing were observed in the fibers constituting the base fabric. However, the stitching could smoothly be conducted without causing any breakage of the thread.

A cured laminate was prepared from the above-described stitched base fabric in the same manner as that of Example 1, followed by the repeated fatigue test. In the test, the cured laminate was damaged after repetition of about $1.6 \times 10^5$ times.

EXAMPLE 5

The same carbon fiber strand as that of Example 1 was twisted to give an S-twist of about 350 turns/m as first twists. Three S-twisted strands were plied and, at the same time, twisted to give a Z-twist of about 250 turns/m as final twists, thereby preparing a thread. The thread thus prepared had a fineness of about 600 denier and a knot strength of 3.3 g/denier.

Stitching of a base fabric and molding of a stitched base fabric were conducted in the same manner as that of Example 1. In these steps, the thread exhibited excellent processability.

The cured laminate thus prepared was subjected to a repeated fatigue test in the same manner as that of Example 1. In the test, the cured laminate was damaged after repetition of $1.4 \times 10^5$ times.

EXAMPLE 6

The same carbon fiber strand as that of Example 4 was twisted to give an S-twist of about 100 turns/m as first twists. Three S-twisted strands were plied and, at the same time, twisted to give a Z-twist of about 80 turns/m as final twists, thereby preparing a thread. The thread thus prepared had a fineness of about 2400 denier and a knot strength of about 4.1 g/denier.

Stitching was conducted with the above-described thread in the same manner as that of Example 1. In the stitching, slight yarn slippage and fuzzing were observed in the fibers constituting the base fabric, and slight fuzzing was observed in the thread as well. However, the stitching could smoothly be conducted without causing any breakage of the thread.

COMPARATIVE EXAMPLE 1

Four carbon fiber strands which are the same as that of Example 4 were plied and twisted in the same manner as that of Example 4 to prepare a thread having a fineness of about 3200 denier. The thread thus prepared had a knot strength of 5.7 g/denier.

Stitching was conducted with the above-described thread in the same manner as that of Example 1. In the stitching, breakage of the thread occurred in the fabrics constituting the base fabric, so that stitching could not smoothly be conducted.

COMPARATIVE EXAMPLE 2

The same spinning solution as that of Example 1 was extruded through a spinneret having 500 holes each having a diameter of 0.05 mm into an aqueous DMSO solution having a DMSO concentration of 25% and a temperature of 60° C. at a coagulation take-up speed of 18 m/min, thereby preparing a coagulated fiber yarn through wet spinning. The coagulated fiber yarn was washed with water, drawn at a draw ratio of about four in hot water, oiled with a silicone lubricant, dried and densified on a heating roll having a surface temperature of 130° to 160° C., and further drawn by a factor of about three in heated steam to prepare an acrylic fiber yarn having a single fiber fineness of 1.1 denier and a fineness of 550 denier.

The acrylic fiber yarn thus prepared was oxidized, carbonized, subjected to surface treatment, and sized with a sizing agent in the same manner as that of Example 1, thereby preparing a carbon fiber strand having a fineness of about 300 denier. The carbon fiber strand thus prepared had a strand strength of 330 kg/mm$^2$, a single fiber fineness of 0.6 denier, and a loop breaking strain of 2.4% as determined according to the single fiber loop test.

Three carbon fiber strands as prepared above were plied and twisted in the same manner as that of Example 1 to prepare a thread. The thread thus prepared had a fineness of about 900 denier and a knot strength of 0.4 g/denier.

Stitching was conducted with the above-described thread in the same manner as that of Example 1. In the process of stitching, the breakage of the thread occurred, so that the stitching could not be conducted.

COMPARATIVE EXAMPLE 3

An acrylic fiber yarn having a single fiber fineness of 1.7 denier and a total fineness of 850 denier was prepared by dry-jet-wetting spinning in the same manner as that of Example 1.

The acrylic fiber yarn thus prepared was oxidized, carbonized, subjected to surface treatment, and sized with a sizing agent in the same manner as that of Example 1, thereby preparing a carbon fiber strand having a fineness of about 400 denier.

The carbon fiber strand thus prepared had a strand strength of 280 kg/mm$^2$, a single fiber fineness of 0.8 denier, and a loop breaking strain of 2.7% as determined according to the single fiber loop test.

Three carbon fiber strands as prepared above were plied and twisted in the same manner as that of Example 1 to prepare a thread. The thread thus prepared had a fineness of about 1200 denier and a knot strength of 0.8 g/denier.

Stitching was conducted with the above-described thread in the same manner as that of Example 1. In the stitching, not only fuzzing of the thread occurred but also the breakage of the thread occurred at several portions. The imperfectly stitched base fabric was molded in the same manner as that of Example 1. In the step of molding, the relative positions of the four weaves were deviated in the portions at which the breakage of the stitching thread had occurred, and much time was taken to correct the relative positions.

The cured laminate thus prepared was subjected to a repeated fatigue test in the same manner as that of Example 1. In the test, the cured laminate was damaged after repetition of about $4 \times 10^4$.

COMPARATIVE EXAMPLE 4

A carbon fiber thread was prepared in the same manner as that of Example 1, except that the carbon fiber strand prepared in Example 1 and having a fineness of about 200 denier was twisted to give an S-twist of 250 turns/m and two S-twisted carbon fiber strands were merely nipped between nip rollers.

The difference in the yarn length between the two carbon fiber stands constituting the thread was measured and found to be as large as about 0.9%. Further, the knot strength of the thread was as low as 0.9 g/denier.

Stitching was conducted with the above-described thread in the same manner as that of Example 1. In the stitching, not only fuzzing of the thread occurred but also the breakage of the thread occurred at several portions.

COMPARATIVE EXAMPLE 5

A braid was prepared by making use of five carbon fiber strands each having a fineness of about 200 denier which had been prepared in the same manner as that of Example 1. However, the braid brought about a distortion and could not stably maintain a linear shape, so that the braid could not be used as a stitching thread.

As described above, in the present invention, a carbon fiber having a predetermined fineness and knot strength is formed into a thread, particularly a stitching thread for a reinforcing fabric of a composite material by plying and twisting. This thread suppresses occurrence of the breakage and fuzzing when a reinforcing fabric is stitched with a thread and exhibits excellent higher processability. Further, since no damage to the fabric is caused during stitching, a reinforcing effect inherent in the reinforcing fabric is not spoiled. Moreover, the thread comprises a carbon fiber having excellent mechanical properties, which not only leads to a very large reinforcing effect for the composite material but also eliminates a fear of spoiling the properties of the composite material through water absorption because the thread exhibits no water absorptivity.

The applications of the thread comprising a carbon fiber according to the present invention are not limited to stitching threads only, and the thread can be used for various applications where high strength properties are required. Examples of these applications include (1) a linking thread, (2) a fishing line, (3) a rope or cable, (4) an electric heating element, (5) an artificial ligament, and (6) a tire cord. The thread may be used as such or in the form of a twisted thread prepared by twisting several threads, a combination of plural threads with a resin, rubber, a metal, or the like.

We claim:

1. A carbon fiber thread comprising plural carbon fiber strands having a first twist of at least 80 turns/m and plied and twisted to give a final twist of at least 50 turns/m in the direction reverse to said first twist, wherein said thread has a fineness of no more than 3000 denier and a knot strength of at least 1.0 g/denier and said carbon fiber strands each comprise a single fiber having a fineness of no more than 0.7 denier and a loop breaking strain of at least 2.5% as determined according to the single fiber loop test.

2. A thread of a carbon fiber according to claim 1, wherein the variation in the length between said plural carbon fiber strands is no more than 0.5%.

3. A thread of a carbon fiber according to claim 1, wherein the number of said carbon fiber strands is 2 to 6.

4. A thread of a carbon fiber according to claim 1, wherein said carbon fiber strands each have a fineness of no more than 1000 denier.

5. A thread of a carbon fiber according to claim 1, wherein said carbon fiber strands each have a strand strength of at least 300 kg/mm$^2$.

6. A stitching thread formed of a carbon fiber according to claim 1.

* * * * *